(12) United States Patent
Davenport et al.

(10) Patent No.: US 7,109,920 B2
(45) Date of Patent: Sep. 19, 2006

(54) MOVING PLATFORM POSITION DETERMINATION SYSTEM AND METHOD

(75) Inventors: David Michael Davenport, Niskayuna, NY (US); John Erik Hershey, Ballston Lake, NY (US); Ralph Thomas Hoctor, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 101 days.

(21) Appl. No.: 10/621,686

(22) Filed: Jul. 16, 2003

(65) Prior Publication Data
US 2005/0012666 A1   Jan. 20, 2005

(51) Int. Cl.
*G01S 3/52*   (2006.01)
(52) U.S. Cl. .................. 342/418; 342/357.05
(58) Field of Classification Search ........... 342/357.05, 342/418, 442, 443, 450
See application file for complete search history.

(56) References Cited

U.S. PATENT DOCUMENTS

| | | | |
|---|---|---|---|
| 5,224,075 A * | 6/1993 | Iino et al. ...................... 367/91 |
| 5,317,515 A | 5/1994 | Matsuzaki |
| 5,347,285 A * | 9/1994 | MacDoran et al. .... 342/357.12 |
| 5,515,062 A | 5/1996 | Maine et al. |
| 6,141,293 A * | 10/2000 | Amorai-Moriya et al. .. 367/127 |
| 6,184,831 B1 * | 2/2001 | Dalby et al. ................. 342/465 |
| 6,236,352 B1 * | 5/2001 | Walmsley ................... 342/118 |
| 6,339,396 B1 | 1/2002 | Mayersak |
| 6,718,174 B1 * | 4/2004 | Vayanos .................. 455/456.1 |

FOREIGN PATENT DOCUMENTS

| | | |
|---|---|---|
| EP | 0605069 | 7/1994 |
| GB | 2226731 | 7/1990 |
| GB | 2376585 A | 12/2002 |
| WO | 03027706 | 4/2003 |

OTHER PUBLICATIONS

Copy of PCT Search Report Dated Jan. 18, 2005.

* cited by examiner

*Primary Examiner*—Dao L. Phan
(74) *Attorney, Agent, or Firm*—Ann M. Agosti; Patrick K. Patnode

(57) ABSTRACT

A system and method for determining a position of a moving platform are provided. The method includes transmitting a carrier signal from one of the moving platform and a stationary platform, receiving a received signal at the other of the moving and stationary platforms, deriving a frequency shift between the carrier signal and the received signal, and calculating the apparent closing velocity using the frequency shift and a frequency of the carrier signal.

57 Claims, 4 Drawing Sheets

MOVING PLATFORM POSITION DETERMINATION SYSTEM AND METHOD

BACKGROUND OF THE INVENTION

The invention is related to velocity estimation systems and more specifically to a system and method for estimating an apparent closing velocity of a moving platform with respect to a stationary platform.

In many applications, for example in railroad systems, advanced, radio-based control systems are used to increase operational safety. For the railroad system to perform safely and efficiently there is a need to know which of a number of possible tracks a locomotive traveling at high speeds has taken. Most often, determining the locomotive position as it travels through a track turn-out and switches to a second parallel track is a significant challenge. In the above example, the locomotive is a moving platform.

Standard global positioning systems (GPS) and differentially corrected GPS are usually deployed to provide fairly accurate locomotive position. However, such systems do not usually provide sufficient information to track a fast moving train through a turn-out and onto a parallel track. In general, the position estimates are averaged over time in order to reduce noise and obtain a sufficient level of confidence in the position estimate. Because locomotives typically travel at very high speeds, using such a method to determine which one of the parallel tracks a locomotive is traveling on is substantially difficult.

Typically, additional sensors such as accelerometers and gyros are used to augment the global positioning systems so as to provide a more robust inertial navigation solution system. One problem with adding additional sensors to the existing GPS is the significant increase in the overall cost, complexity and failure modes of the system.

It would therefore be desirable to implement a low-cost, high-performance system that can accurately determine the position of a moving platform, like a locomotive, traveling at high speeds.

BRIEF DESCRIPTION OF THE INVENTION

Briefly, in accordance with one embodiment of the invention, a method for determining a position of a moving platform is provided. The method comprises transmitting a carrier signal from one of the moving platform and a stationary platform, and receiving a received signal at the other of the moving and stationary platform. The method further comprises deriving a frequency shift between the carrier signal and the received signal and calculating the apparent closing velocity using the frequency shift and the frequency of the carrier signal.

In another embodiment, a system determining a position of a moving platform is provided. The system comprises a transmitter configured for transmitting a carrier signal from one of the moving platform and a stationary platform and a receiver configured for receiving a received signal at the other of the moving and stationary platforms. The system further comprises a processor configured for deriving a frequency shift between the carrier signal and the received signal, and calculating the apparent closing velocity using the frequency shift of the received signal and the frequency of the carrier signal.

In another embodiment, a system for determining a position of a moving platform is provided. The system comprises a transmitter configured for transmitting a modulated carrier signal and a receiver configured for demodulating the transmitted signal. The receiver further comprises a processor configured for deriving a frequency shift between the carrier signal and the received signal, calculating an apparent closing velocity using the frequency shift of the received signal relative to a center frequency of the transmitted signal, and estimating the position of the moving platform by monitoring the apparent closing velocity over a period of time.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
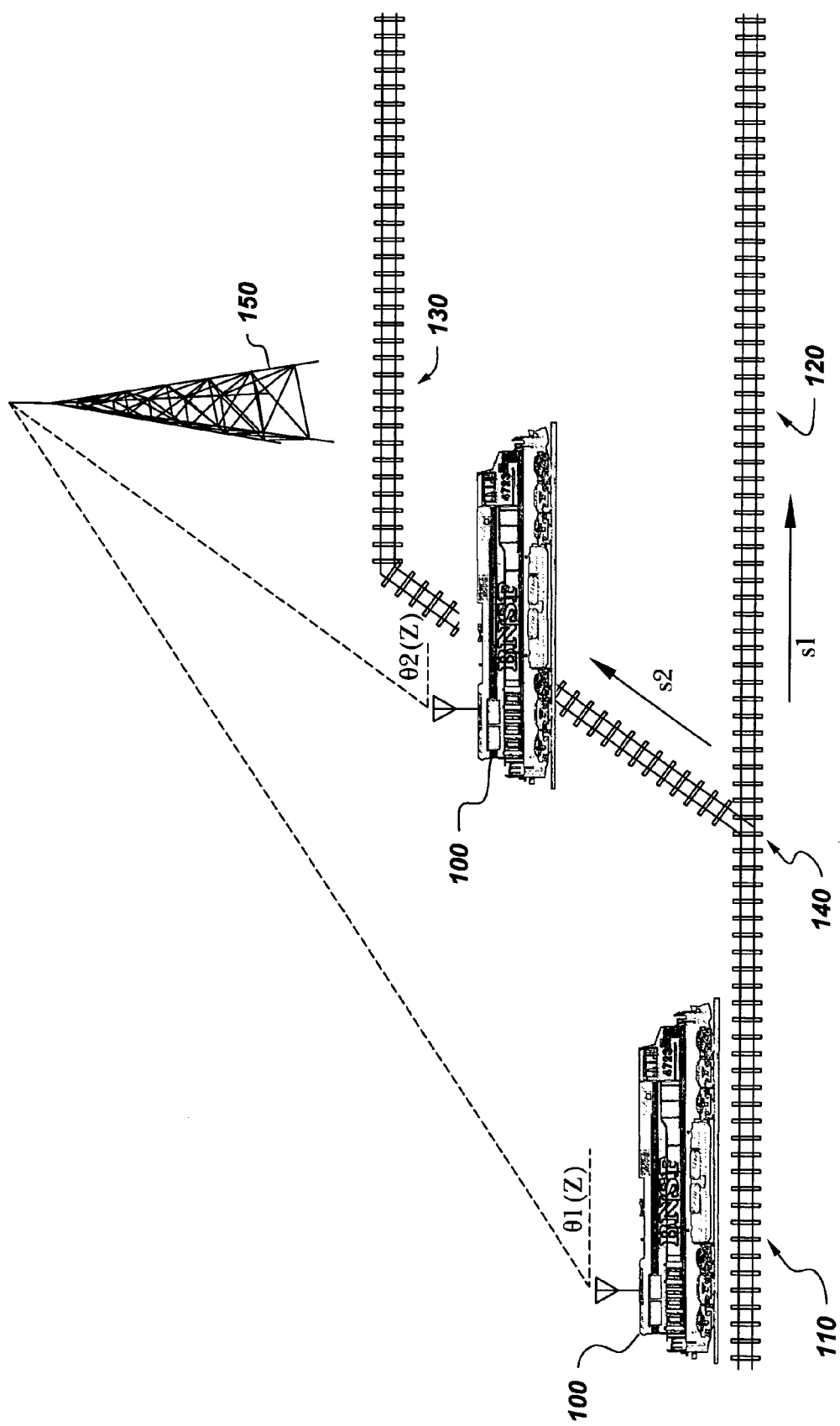
FIG. 1 is a block diagram illustrating the motion of a moving platform relative to a stationary platform.

FIG. 1 is a block diagram illustrating the motion of a moving platform 100 relative to a stationary platform 150. In one embodiment, moving platform 100 is a train. As used herein, "train" refers to one or more locomotives with or without coupled passenger or freight cars.

In a further embodiment, the stationary platform comprises a radio transmitter having a known location relative to a railroad track. In a more specific embodiment, the transmitter has a known location relative to a turn-out or switch on the railway track. In an alternate embodiment, the stationary platform is a mobile communication platform base station. In another embodiment, the stationary platform is a broadband station. In another embodiment, the stationary platform is a cellular network base station.

Figure 2:
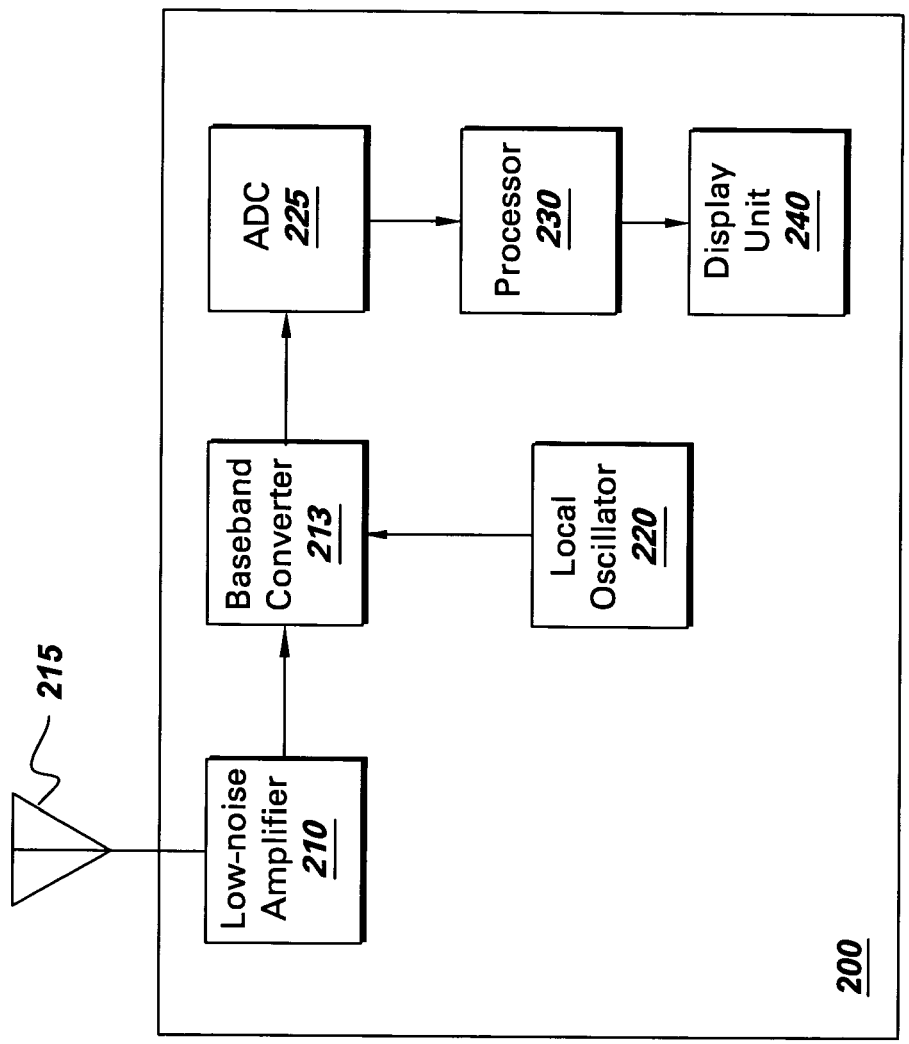
FIG. 2 is a block diagram illustrating an embodiment of a system implemented to determine a position of a moving platform.

FIG. 2 is a block diagram of receiver system 200 implemented according to an aspect of the invention. In one embodiment, the receiver system is implemented on the moving platform. In another embodiment, the receiver system is implemented on the stationary platform. By way of example only, the description is continued with reference to the receiver system implemented on the moving platform.

As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

The receiver system is configured for determining a position of a moving platform relative using an apparent closing velocity of the moving platform. The apparent closing velocity is that component of the velocity of the moving platform that is in the direction of the stationary platform. In one embodiment, the moving platform comprises a locomotive.

Receiver system 200 comprises a receiver element such as an antenna 215 configured for receiving a carrier signal transmitted by the transmitter (which is shown as being situated at the stationary platform 150 in FIG. 1 for purposes of example). The receiver system further comprises a low-noise amplifier 210 to amplify the output of antenna 215. A local oscillator 220 is configured for nominally producing a local signal of the transmitter's center frequency. In one embodiment, the carrier signal has a nominal center frequency of 160 MHz. In another embodiment, the carrier signal has a nominal center frequency of 5.8 GHz.

A base-band converter 213 is configured for converting the received RF signal to a complex base-band signal. The receiver system further comprises an analog-to-digital converter 225 coupled to the base-band converter and configured for converting the analog base-band signals to corresponding digital representation.

Processor 230 is coupled to analog-to-digital converter 225 and is configured for analyzing a frequency spectrum of the received signal. Processor 230 is configured for processing of the digital representation of the received signal to estimate the apparent closing velocity of the moving platform. Processor 230 may comprise an analog processor, a digital processor, or combinations thereof. In one embodiment, the processor can display the estimated apparent closing velocity and the position of the moving platform on display unit 240. In another embodiment, the processor can communicate the estimated apparent closing velocity and the position of the moving platform to a control station from where the information can be transferred appropriately. The method by which the processor estimated the apparent closing velocity is described in further detail below.

Referring to FIG. 1, when the train approaches switch 140 on track 110, the train can be switched either to track 120 or to track 130. As shown in FIG. 1, the train is moving at a speed s1 on track 120 and at a speed s2 when traveling on track 130. The speed is typically constant while the train proceeds through the switch, regardless of which track is taken.

A location-varying angle between an antenna on the train and an antenna on the stationary platform is θ1(z) when the moving platform is on tracks 110 and 120. Similarly, the location-varying angle between an antenna on the train and an antenna on the stationary platform is θ2(z) when the moving platform is on tracks 110 and 130. The independent variable z represents the distance that the train has gone down the track. The shapes of the two functions θ1(z) and θ2(z) differ due to the geometrical difference between the two tracks. The effect of the differing speed between the two tracks causes a stretch or compression of the angle functions θ1(s1*t) and θ2(s2*t) relative to one another. The time-varying apparent closing velocity can be expressed in terms of the angle functions as $$v_c(t) = s \times \cos(\theta(s \times t)) \quad (1)$$

In one embodiment, the transmitter and receiver on the stationary and moving platforms respectively, are used to measure a frequency shift of the frequency of the received signal from the nominal transmitted frequency. One cause for the frequency shift is due to a mismatch between the local oscillator frequencies at the transmitter and receiver. Another cause of the frequency shift is due to the motion of the moving platform.

The apparent closing velocity can be determined using the following equation:

$$f_d(t) = \frac{f_c v_c(t)}{c} + f_m + n(t) \quad (2)$$

where $f_d(t)$ is the time-varying frequency shift, $f_c$ is the center frequency of the transmitted carrier signal, c is a speed of radio propagation, $f_m$ is a constant frequency offset between the local oscillators at the transmitter and receiver, n(t) is a measurement noise and $v_c(t)$ is the time-varying apparent closing velocity defined in Equation 1.

In one embodiment of the system, processor 230 estimates the offset fm between the local oscillator frequency and the frequency of the received carrier signal by estimating the frequency of the complex-valued, residual carrier signal. Methods for performing such an operation are well known in communications theory. In one such method, the sample-to-sample phase difference is extracted from the measurement and passed through a low-pass filter to eliminate noise.

In another embodiment, the received signal is a modulated, data-bearing radio transmission. The embodiment is especially advantageous when a data telemetry radio is already in use on the train, since in such a case the embodiment may require the addition of only a few components. In one embodiment, a pre-existing receiver is modified to generate the frequency offset as any radio receiver that demodulates a modulated data transmission signal estimates and tracks the center frequency as part of the reception process.

The apparent closing velocity described by Equation 2 is characterized by a measured shape described by the function cos(θ(z)). Thus, the apparent closing velocity is related to the angle function through the cosine. In an exemplary embodiment, the shapes are measured and stored. Such a measurement can be obtained by driving a train equipped with a radio transmitter or receiver over all the possible tracks, or by surveying the angles to the stationary platform along each of the possible tracks. In a more specific embodiment, the decision as to which track had been taken by a train is made by comparing the shape of the measured apparent closing velocity to the stored shapes associated with the possible track locations. The shape that matches the apparent closing velocity is associated with a particular railroad track, since all the angle functions are the result of a survey of the railroad tracks. The railroad track whose associated shape best matches the apparent closing velocity curve is selected as the location of the train.

The comparison can be made on a measurement-by-measurement basis, and by using methods of sequential inference theory, which is well known to the practitioners of applied statistics. Using sequential statistical methods ensures that the track location decision is made at an earliest moment, consistent with a desired probability of error.

The comparison between measured shape of the apparent closing velocity to stored shapes associated with the possible track locations, cos(θ(z)) typically requires temporal dilation and amplitude scaling operations. Such operations are well known to those skilled in the art of pattern recognition as well as nonlinear regression.

In an alternative embodiment, the speed of the moving platform can be determined by coupling a tachometer to the moving platform. The speed information can be used to extract the location-varying angle function directly from the measured frequency shift, without the intermediate numerical steps that would otherwise be required.

The processor 230 is configured for calculating an apparent closing velocity using the measured frequency shift. In some embodiments, the processor is further configured for estimating the location of the moving platform by monitoring the apparent closing velocity over a period of time.

In another embodiment, a transmitter is coupled to the stationary platform and the processor is configured to derive the frequency shift by analyzing a frequency spectrum of the received signal. The frequency spectrum of the received signal can be obtained using the well-known periodogram method and the FFT algorithm. The center frequency can then be computed as the arithmetic mean of the center frequencies of the discrete Fourier transform (DFT) bins, weighted by the periodogram power estimates for each bin.

Figure 3:
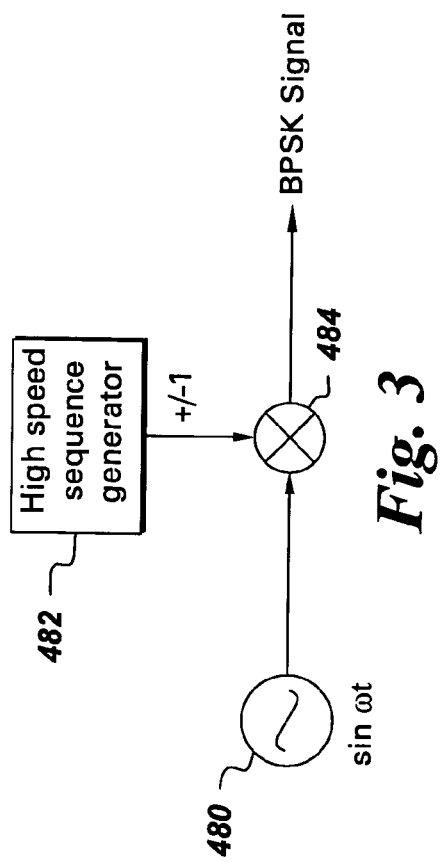
FIGS. 3–4 are block diagrams illustrating another embodiment of a system implemented to estimate an apparent closing velocity of a moving platform using spread spectrum.

In an alternate embodiment, the frequency shift is obtained using spread spectrum feature extraction. FIG. 3 is a block diagram of an embodiment of a spread spectrum transmitter for transmitting a signal using binary phase shift keying (BPSK). Signal source 480 generates a signal sin((ωt) which is combined with the output signal of a high speed sequence generator 482 in a mixer 484 to produce a wideband BPSK spread spectrum signal.

The BPSK transmitted signal, S(t), may be described by S(t)=b(t)sin(ωt) where b(t) is the bit from the high-speed generator 482 at time t, where b(t) $\epsilon\{\pm 1\}$. The sequence of bits, {b(t)} constitutes a spreading code and appears pseudorandom. The timing is according to established and general principles in the art that require synchronization so that sin(ωt) be zero at the transitions between the high speed sequence generator bit boundaries.

Any one of a number of various techniques can be used by receiver systems to recover center frequency in spread spectrum feature extraction. One such technique involves homodyning, or squaring the spread spectrum signal, and filtering out the direct current (or DC) component. If the center frequency of the transmitted spread spectrum signal is ω radians per second, then a relative motion shifts the center frequency according to the Doppler relation. The shift can be produced as a spectral line at twice the Doppler shift by using the spread spectrum illustrated in FIG. 5.

Figure 4:
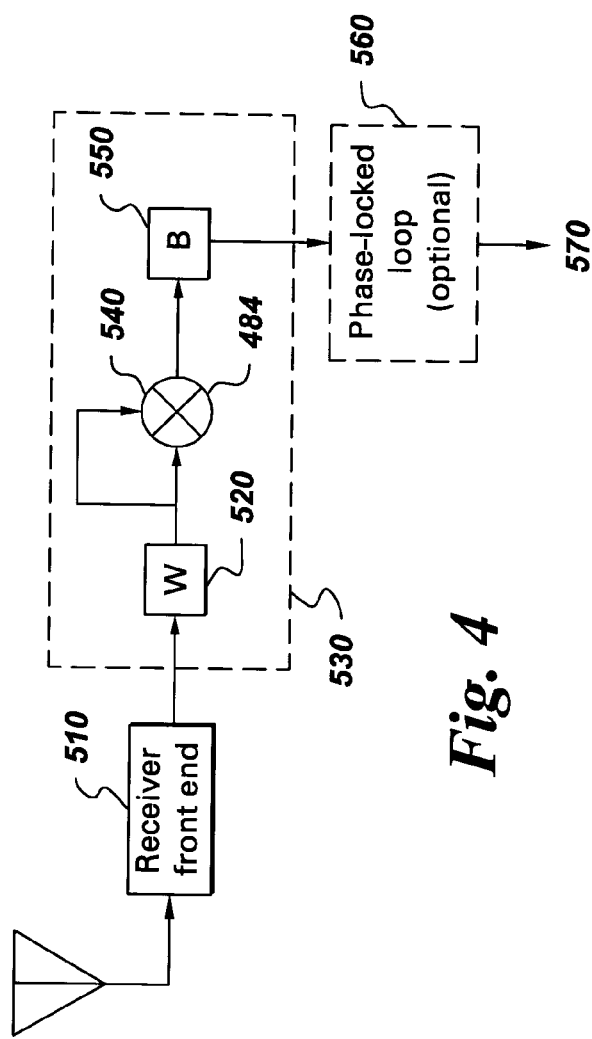

FIG. 4 is a block diagram of an embodiment of a spread spectrum system 500 implemented for generating a spectral line at twice the Doppler shift. BPSK signals are received by receiver front end 510 and are converted to intermediate frequency signals. The intermediate frequency signals are provided to a wide band pass filter 520 in squaring loop system 530. The filter 520 has a spectral width W and is wide enough to pass the main lobe of the overlay signal that is centered at co. The output signals of filter 520 are provided to a multiplier 540 that squares the wideband overlay signal passed by filter 520. The output signals of multiplier 540, in turn, are provided to a narrow band pass filter 550 of bandwidth B. The system 500 generates a spectral line 570. A phase-locked loop 560 is inserted to provide greater short-term stability, should there be fast flat fading or other such condition that would decrease $$\left(\frac{S}{N}\right)_{IN}.$$

The bandwidth B is centered on the spectral line produced without Doppler shift. The bandwidth B is selected to be just sufficient to pass the spectrum containing a tone produced by a Doppler shift. By making the assumption that the overlay signal is immersed in additive white Gaussian noise, and the signal-to-noise ratio (SNR) into the squaring loop apparatus of the FIG. 4 is $$\left(\frac{S}{N}\right)_{IN}$$

and the SNR of the system 500 is $$\left(\frac{S}{N}\right)_{OUT},$$

it is well known that $$\left(\frac{S}{N}\right)_{OUT} = \frac{1}{2}\left(\frac{S}{N}\right)_{IN}^2 \frac{W}{B}.$$

The above technique can be used if the location of the BPSK direct sequence spread spectrum transmitter is known. For purpose of illustration it is assumed that stationary platform 150 of FIG. 1 meets the above criterion.

Figure 5:
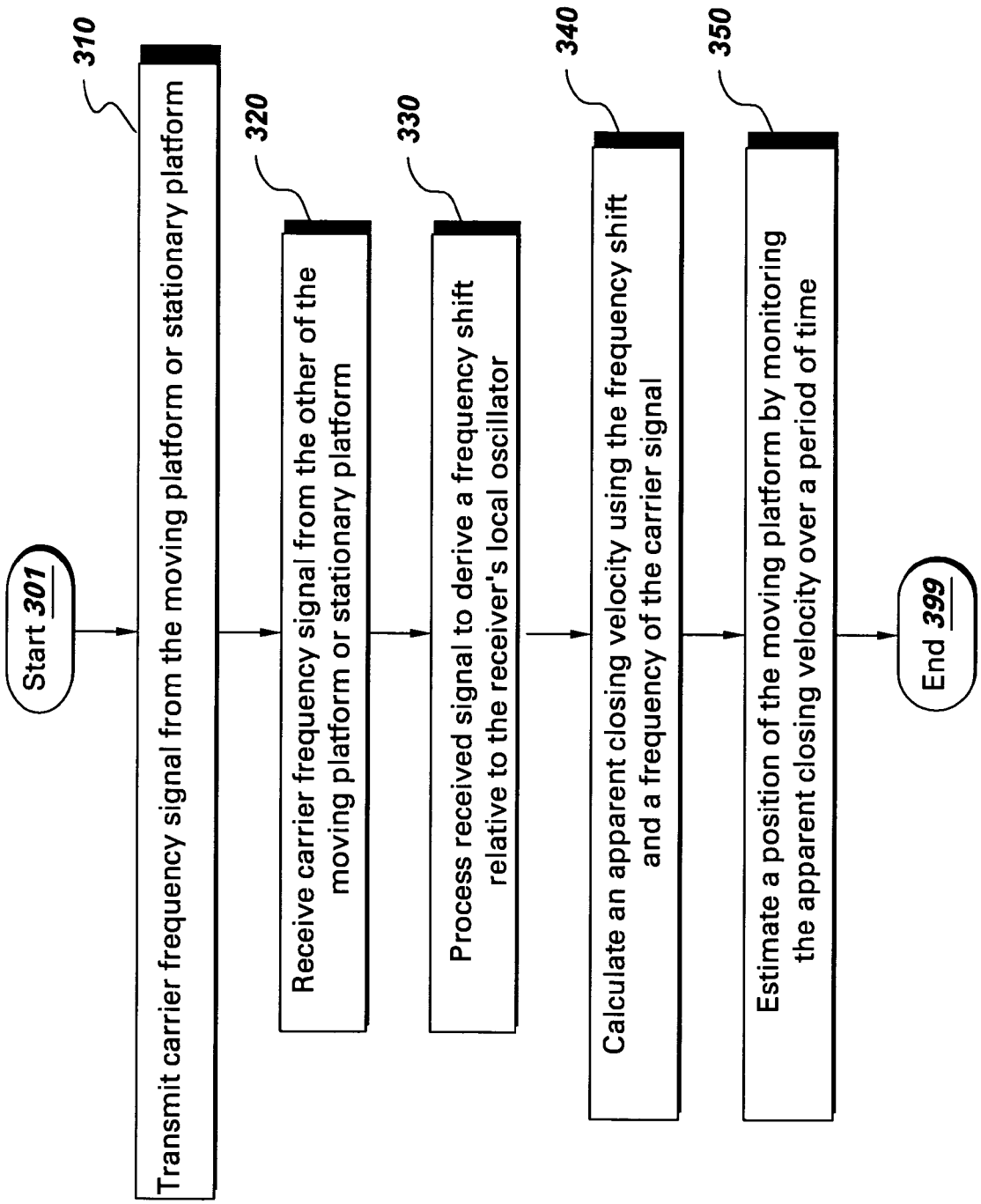
FIG. 5 is a flow chart illustrating one method by which an apparent closing frequency of a moving platform is estimated to determine a position of a moving platform.

FIG. 5 is a flow chart illustrating the method by which than apparent closing velocity of a moving platform is estimated. Each step of the method is described in further detail below.

In step 310, a carrier signal is transmitted. In one embodiment, the carrier signal is transmitted from the moving platform. In an alternate embodiment, the carrier signal is transmitted from a stationary platform.

In step 320, a received signal is received at the other of the moving and stationary platforms. For example, if the stationary platform transmits the carrier signal, the moving platform receives the received signal. Similarly, if the moving platform transmits the carrier signal, the stationary platform receives the received signal.

In step 330, the received signal is processed to generate a corresponding frequency spectrum. A frequency shift is derived between the carrier signal and the received signal using the frequency spectrum. In another embodiment, the mean frequency of the complex low-pass signal associated with the received bandpass signal is estimated directly, using one of a number of well-known methods.

In step 340, an apparent closing velocity is calculated using the frequency shift and a frequency of the carrier signal.

In step 350, a position of the moving platform is estimated by monitoring the apparent closing velocity over a period of time.

In another embodiment of the invention, multiple stationary platforms are used to further increase the performance of train location system. The deployment of multiple stationary platforms affords a computational advantage as estimates of apparent closing velocity from each station platform can be combined to reduce the influence of measurement noise denoted by n(t) in Equation 1. One approach to such noise reduction is the simple averaging of the multiple data estimates.

In one embodiment, the moving platform is a train. In another embodiment, the stationary platform is an existing radio base station. The stationary platform comprises a transmitter whose location is known in relation to that of a railroad track. In a more specific embodiment, the transmitter's location is known in relation to a turn-out on the railway track. Other alternatives of the stationary platform comprise mobile communication platform base station, broadband station, cellular network base station or any other broadcast station.

The previously described embodiments of the present invention have many advantages, including increased performance for locating a moving platform by monitoring the changes in the apparent closing velocity. In addition, the system is cost effective as existing hardware and broadcast systems can be used. Avoiding the implementation of additional sensors reduces exposure to reliability issues and sensor hardware failures. Additionally, in the case of locomotives, radio telemetry systems are implemented on the locomotives to communicate measurements to stationary receivers located along the tracks. The existing radio system can be used to determine the position of a moving locomotive, thus reducing the need of additional components.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for determining a position of a moving platform, the method comprising:
   transmitting a carrier signal from one of the moving platform and a stationary platform;
   receiving a received signal at the other of the moving and stationary platforms;
   deriving a frequency shift between the carrier signal and the received signal; and
   calculating the apparent closing velocity using the frequency shift and a frequency of the carrier signal;
   wherein calculating the apparent closing velocity comprises using the equation:

$$f_d(t) = \frac{f_c v_c(t)}{c} + f_m + n(t)$$

wherein fd(t) represents the frequency shift, fc represents a center frequency of the carrier signal, c represents a speed of radio propagation, fm is a constant frequency offset between local oscillators at the transmitter and the receiver system, n(t) represents a measurement noise and vc(t) represents the apparent closing velocity.

2. The method of claim 1, wherein determining the position of the moving platform comprises monitoring the closing velocity over a period of time.

3. The method of claim 1, wherein the apparent closing velocity is characterized by a measured shape described by $\cos(\theta(z))$, wherein z represents the distance that the moving platform has traveled and $\theta$ represents a location-varying angle.

4. The method of claim 3, further comprising determining a course of the moving platform by comparing the measured shape to a plurality of stored shapes.

5. The method of claim 4, wherein the comparing comprises using sequential statistical methods.

6. The method of claim 1, wherein deriving the frequency shift comprises analyzing a frequency spectrum corresponding to the received signal.

7. The method of claim 1, wherein deriving the frequency shift comprises generating a spread spectrum of the received signal.

8. The method of claim 7, wherein generating a spread spectrum further comprises generating a spectral line at twice the frequency of a Doppler shift of the received signal.

9. The method of claim 8, wherein the Doppler shift is determined using a center frequency of the received signal.

10. The method of claim 9, wherein the center frequency of the received signal is determined by homodyning the spread spectrum of the received signal.

11. The method of claim 1, wherein the stationary platform comprises a plurality of stationary platforms.

12. A method for determining a position of a moving platform, the method comprising:
    transmitting a carrier signal from one of the moving platform and a stationary platform;
    receiving a received signal at the other of the moving and stationary platforms;
    deriving a frequency shift between the carrier signal and the received signal; and
    calculating the apparent closing velocity using the frequency shift and a frequency of the carrier signal; wherein the stationary platform comprises a transmitter coupled to a railway track.

13. The method of claim 12, wherein the transmitter is coupled to a turnout on the railway track.

14. The method of claim 1, wherein the stationary platform comprises a mobile communication platform base station.

15. The method of claim 1, wherein the stationary platform comprises a broadcast station.

16. The method of claim 1, wherein the stationary platform comprises a cellular network station.

17. A method for determining a position of a moving platform, the method comprising:
    transmitting a carrier signal from one of the moving platform and a stationary platform;
    receiving a received signal at the other of the moving and stationary platforms;
    deriving a frequency shift between the carrier signal and the received signal; and
    calculating the apparent closing velocity using the frequency shift and a frequency of the carrier signal; wherein the moving platform is a locomotive.

18. The method of claim 1, wherein the carrier signal comprises radio frequency signals.

19. A system for determining a position of a moving platform, the system comprising:
    a transmitter configured for transmitting a carrier signal from one of the moving platform and a stationary platform;
    a receiver system configured for receiving a received signal from the other of the moving and stationary platforms, the receiver system further comprising:
    a processor configured for:
    (i) deriving a frequency shift between the carrier signal and the received signal;
    (ii) calculating the apparent closing velocity angle using the frequency shift and a frequency of the carrier signal, wherein the processor is configured for deriving the apparent closing velocity using the equation:

$$f_d(t) = \frac{f_c v_c(t)}{c} + f_m + n(t)$$

wherein fd(t) represents the frequency shift, fc represents a center frequency of the carrier signal, c represents a speed of radio propagation, fm is a constant frequency offset between local oscillators at the transmitter and at the receiver system, n(t) represents a measurement noise and vc(t) represents the apparent closing velocity.

20. The system of claim 19, wherein the processor is further configured for determining the position of the moving platform by monitoring the apparent closing velocity over a period of time.

21. The system of claim 19, wherein the processor is further configured to characterize the apparent closing velocity by a measured shape described by cos(θ(z)), wherein z represents the distance that the moving platform has traveled and θ represents a location-varying angle.

22. The system of claim 21, wherein the processor is further configured for determining a course of the moving platform by comparing the measured shape to a plurality of stored shapes.

23. The system of claim 22, wherein processor is configured for comparing the measured shape to a plurality of stored shapes using sequential statistical methods.

24. The system of claim 19, wherein the transmitter is coupled to the stationary platform and the processor is configured to derive the frequency shift by analyzing a frequency spectrum of the received signal.

25. The system of claim 19, wherein the processor is configured for the deriving the frequency shift by generating a spread spectrum of the received signal.

26. The system of claim 25, wherein the processor further comprises a spread spectrum system configured for generating a spectral line at twice the frequency of a Doppler shift of the received signal.

27. The system of claim 26, wherein the Doppler shift is determined using a center frequency of the received signal.

28. The system of claim 27, wherein the center frequency of the received signal is determined by homodyning the spread spectrum of the received signal.

29. The system of claim 19, wherein the carrier signal comprises radio frequency signals.

30. The system of claim 19, wherein the stationary platform comprises a plurality of stationary platforms.

31. A system for determining a position of a moving platform, the system comprising:
a transmitter configured for transmitting a carrier signal from one of the moving platform and a stationary platform;
a receiver system configured for receiving a received signal from the other of the moving and stationary platforms,
the receiver system further comprising:
a processor configured for:
(i) deriving a frequency shift between the carrier signal and the received signal;
(ii) calculating the apparent closing velocity angle using the frequency shift and a frequency of the carrier signal, wherein the stationary platform comprises a transmitter coupled to a railway track.

32. The system of claim 31, wherein the transmitter is coupled to a turnout on the railway track.

33. The system of claim 19, wherein the stationary platform comprises a mobile communication platform base station.

34. The system of claim 19, wherein the stationary platform comprises a broadband station.

35. The system of claim 19, wherein the stationary platform comprises a cellular network base station.

36. A system for determining a position of a moving platform, the system comprising:
a transmitter configured for transmitting a carrier signal from one of the moving platform and a stationary platform;
a receiver system configured for receiving a received signal from the other of the moving and stationary platforms, the receiver system further comprising:
a processor configured for:
(i) deriving a frequency shift between the carrier signal and the received signal;
(ii) calculating the apparent closing velocity angle using the frequency shift and a frequency of the carrier signal, wherein the moving platform comprises a locomotive.

37. The system of claim 19, wherein the receiver system is coupled to the moving platform.

38. The system of claim 19, wherein the receiver system is coupled to the stationary platform.

39. A system for determining a position of a moving platform, the system comprising:
means for transmitting a carrier signal from one of the moving platform and a stationary platform;
means for receiving a received signal at the other of the moving and stationary platforms;
means for deriving a frequency shift between the carrier signal and the received signal;
means for calculating the apparent closing velocity using the frequency shift, a frequency of the carrier signal;
wherein the means for calculating the apparent closing velocity shift comprising using the equation:

$$f_d(t) = \frac{f_c v_c(t)}{c} + f_m + n(t)$$

wherein fd(t) represents the frequency shift, fc represents a center frequency of the carrier signal, c represents a speed of radio propagation, fm is a constant frequency offset between local oscillators at the transmitter and at the receiver system, n(t) represents a measurement noise and vc(t) represents the apparent closing velocity.

40. The system of claim 39, determining the position of the moving platform further comprises means for monitoring the apparent closing velocity over a period of time.

41. The system of claim 39, wherein the means for calculating the apparent closing velocity comprises means for characterizing the apparent closing velocity by a measured shape described by cos(θ(z)), wherein z represents the distance that the moving platform has traveled and θ represents a location-varying angle.

42. The system of claim 41, further comprising means for determining a course of the moving platform by comparing the measured shape to a plurality of stored shapes.

43. The system of claim 39, wherein the means for deriving the frequency shift comprises means for analyzing a frequency spectrum corresponding to the received signal.

44. The system of claim 39, wherein the means for deriving the frequency shift comprises means for generating a spread spectrum of the received signal.

45. The system of claim 44, wherein the means for generating the spread spectrum further comprises means for generating a spectral line at twice the frequency of a Doppler shift of the received signal.

46. A system for determining a position of a moving platform, the system comprising:
a transmitter configured for transmitting a modulated carrier signal;
a receiver system configured for demodulating a received carrier signal, the receiver system further comprising a processor configured for
deriving a frequency shift between the carrier signal and the received signal,
calculating an apparent closing velocity using the frequency shift of the received signal relative to a center frequency of the transmitted carrier signal, and
estimating the position of the moving platform by monitoring the apparent closing velocity over a period of time.

47. The system of claim 46, wherein the processor is configured for calculating the apparent closing velocity using the equation:

$$f_d(t) = \frac{f_c v_c(t)}{c} + f_m + n(t)$$

wherein fd(t) represents the frequency shift, fc represents a center frequency of the carrier signal, c represents a speed of radio propagation, fm is a constant frequency offset between local oscillators at the transmitter and at the receiver system, n(t) represents a measurement noise and vc(t) represents the apparent closing velocity.

48. The system of claim 47, wherein the processor is further configured to characterize the apparent closing velocity by a measured shape described by $\cos(\theta(z))$, wherein z represents the distance that the moving platform has traveled and $\theta$ represents a location-varying angle.

49. The system of claim 48, wherein the processor is further configured for determining a course of the moving platform by comparing the measured shape to a plurality of stored shapes.

50. The system of claim 49, wherein processor is configured for comparing the measured shape to a plurality of stored shapes using sequential statistical methods.

51. The system of claim 46, wherein the transmitter is coupled to the stationary platform and the processor is configured to derive the frequency shift by analyzing a frequency spectrum of the received signal.

52. The system of claim 46, wherein the processor is configured for the deriving the frequency shift by generating a spread spectrum of the received signal.

53. The system of claim 52, wherein the processor further comprises a spread spectrum system configured for generating a spectral line at twice the frequency of a Doppler shift of the received signal.

54. The system of claim 53, wherein the processor is further configured for determining the Doppler shift by using a center frequency of the received signal.

55. The system of claim 54, wherein the center frequency of the received signal is determined by homodyning the spread spectrum of the received signal.

56. The system of claim 46, wherein the moving platform is a locomotive.

57. The system of claim 56, wherein the stationary platform comprises a plurality of stationary platforms.

* * * * *